April 15, 1924.

Re. 15,816

C. L. BELL

HASP LOCK

Original Filed Feb. 21, 1919

Inventor

Clinton L. Bell,

Witness

Chas. L. Griesbauer

By Chas. H. La Ponte

Attorney

Reissued Apr. 15, 1924. Re. 15,816

UNITED STATES PATENT OFFICE.

CLINTON L. BELL, OF DECATUR, ILLINOIS.

HASP LOCK.

Original No. 1,321,783, dated November 11, 1919, Serial No. 278,399, filed February 21, 1919. Application for reissue filed May 1, 1920. Serial No. 378,259.

*To all whom it may concern:*

Be it known that I, CLINTON L. BELL, a citizen of the United States, residing at Decatur, in the county of Macon and State of Illinois, have invented the new and useful Improvements in Hasp Locks, of which the following is a specification.

My present invention relates to improvements in locks or fasteners of the type adapted for use on gates or the doors of barns or outbuildings especially those which are exposed to the weather.

A primary object of my invention is to provide a hasp lock whereon will be provided a housing over the movable latch and keeper to protect those parts from sleet and snow, thus to obviate the inconvenience of breaking ice therefrom in the winter and to prevent deterioration of those parts resulting from rust, the housing at the same time performing the function of a pull whereby the gate or door may be opened.

Another object is to arrange such a hasp lock so that it will effectively prevent the unlatching of the hasp by horses or other animals, and yet be most simple and convenient in its operation from either side of the door for an attendant.

A still further object is to so design the parts of such a hasp that the several elements may be reversible for right or left, and to supply means for adapting the hasp to suit a changed alinement in case of the sagging or warping of the door or gate.

With the above and other objects in view, my invention comprises certain new and useful details of construction and arrangement of parts which will be fully described herein, illustrated in the accompanying drawings, and pointed out more specifically in the appended claims.

In describing my invention in detail, reference will be had to the accompanying drawings, wherein like characters denote like or corresponding parts throughout the several views.

Figure 1:
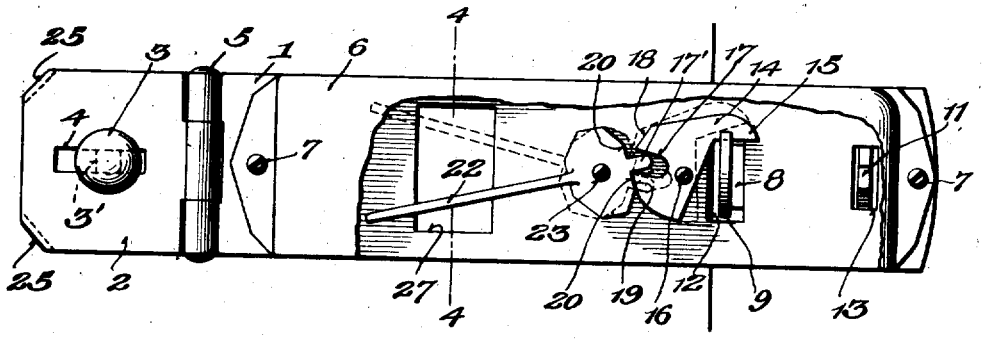
Figure 1 is a front elevation of my hasp and keeper, the housing being broken away to more clearly illustrate the latching elements.
Figure 4:
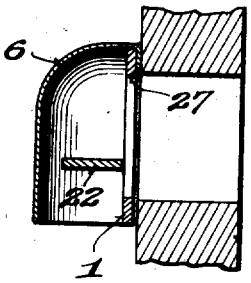
Figure 4 is a sectional view of my hasp, taken on line 4—4 of Figure 1.

Referring now to the drawings, numeral 1 designates the hasp plate, hinged at 5 to hinge plate 2. Hinge plate 2 is preferably mounted to a door or gate so that the hasp plate will extend across the crack of the door, a bolt 3 passing through the elongated rectangular slot 4 in the hinge plate, and a nut applied on the inner end of the bolt on the inside of the door. A squared neck 3′ is provided on the bolt to prevent the hinge plate from rotating on the bolt, the upper and lower walls of the slot engaging the neck. Sharpened teeth 25 are also provided on the inner face of the hinge plate 2 to prevent the rotation of the hasp and bolt in the bolt hole in the door, said teeth being embedded in the door when the hinge plate is bolted in place.

Hasp plate 1 is provided with a vertical slot 12 adjacent the outer end, and a keeper plate 8 is fixed by screws 26 to the door jamb in such a position that keeper 9 carried thereby will register with said slot and enter the same when the hasp plate is swung back against the closed door. Slot 12 is preferably wider and longer than the keeper 9 so that the keeper will not engage the walls, of the slot, a guide tooth 11 being provided on the keeper plate adapted to enter a vertical slot 13 in the hasp plate, the length of the slot 13 being substantially equal to the depth of tooth 11, so that the weight of the hasp may be carried by said tooth, should the hasp become loose on its mounting. This prevents the hasp plate from engaging the keeper, thus to destroy the ease of operation desired of the hasp.

The latching device is carried on the outer face of the hasp plate and comprises a latch 14 pivoted to the plate by a pin 16, the latch comprising a laterally extending latch tooth 15 positioned to engage the keeper 9 on its upper edge, notches or shoulders 10 being provided on the keeper into which the tooth may engage when the hasp is swung against the closed door. On the opposite side of latch 14 is a cut-out notch 17, and a projecting tongue 17′ is carried by a pivoted actuating lever 22, said tongue positioned to register with said notch. Lever 22 is pivoted by pin 23, preferably in a horizontal line with pivoting pin 16, the lever being extended horizontally and of sufficient width to provide a finger-hold for the operation thereof. It will be readily seen that as the free end of lever 22 is swung upward about pivoting pin 23 to the dotted line position shown in Figure 1, the projecting tongue 17′ will engage the lower wall of notch 17 and actuate the toothed upper end of latch 14 upward, causing tooth 15 on the latch to be drawn out of engagement with the keeper. The adjacent edges of the actuating lever 22 and the latch 14 are provided respectively with abutting edges 21 and 18, which will engage when the tooth 15 has been drawn up sufficiently to disengage the keeper, thus limiting the upward travel of the tooth.

Figure 3:
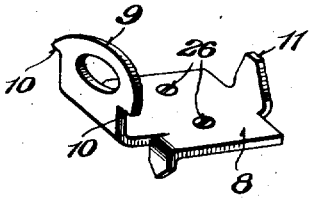
Figure 3 is a detail perspective of the keeper plate for my hasp.
Figure 2:
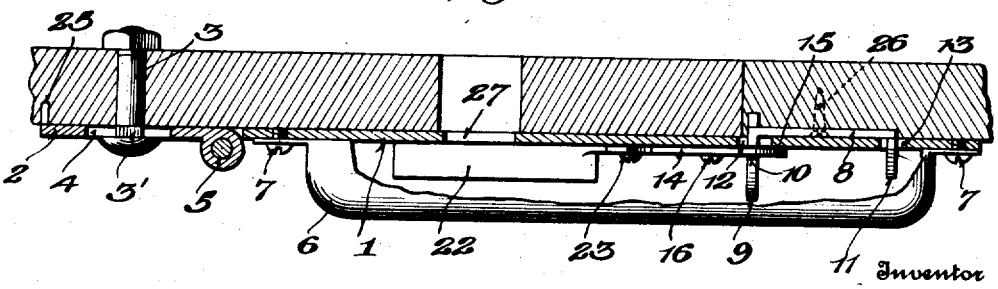
Figure 2 is a top plan view of my hasp, the housing also being broken away.

To make it possible for the device to be used either right or left, as previously stated, the keeper 9 on the keeper plate 8 is provided with duplicate notches or shoulders 10, and the tooth 11 on said keeper plate is shown beveled, or with inclined faces converging to the outer end of said tooth, see Figure 3. It will therefore be seen that when the keeper plate 8 is used on a hasp located on the right side of a door opening, the latch tooth 15 of the latch 14 will engage one of the notches or shoulders 10 on the keeper 9, and the construction of the tooth 11 on the keeper plate is such that it will enter the slot 13 in the hasp plate 1, and that when the keeper plate 8 is used on a hasp located on the left side of a door opening, the latch tooth 15 on latch 14, which has been reversed by removing screw 16 and turning latch 14 over on hasp plate 4, will engage with the other notch or shoulder 10, and the tooth 11 will enter the slot 13 as in the case when the keeper plate is on the other side of the door.

This hasp will, at this point in its operation, be free to swing outward from the door. Upon the release of the actuating lever 22 by the operator, said lever will gravitate downward at its free end to the position shown in full lines in Figure 1, whereupon the upper edge of tongue 17′ will engage the upper wall of slot 17, and force the upper toothed end of latch 14 downward about its pivoting point 16. The adjacent edges 20 and 19 of the lever and latch, respectively, will engage, thus limiting the downward travel of each of these parts about their respective pivoting pins.

I provide means for unlatching my hasp from the inside of the closed and latched door by providing an opening through the door directly back of hasp plate 1, and also providing a perforation 27 through the hasp plate positioned to register with the hole through the door. It will be readily seen that the operator may insert his finger through the door and perforation 27 and engage the under side of lever 22, thus to swing the lever upward, unlatching the hasp.

In order to protect my device from the weather, and also to provide a pull for my hasp and the door, I provide an open bottomed housing, such as 6, which envelops the forward face of hasp plate 1, the same being fixed to the hasp by screws 7. It will be readily seen that such a housing provides protection from the weather, effectively prevents the operation of the latch by animals, and provides a pull for the hasp and door.

Having thus described my invention, what I claim is:

1. The combination with a hasp to be carried by a door, of a housing mounted thereon having an open bottom providing a finger hold whereby the door may be actuated, a latch pivoted to the hasp beneath the housing, said hasp equipped with a slot adapted to receive a keeper beneath the housing, and a keeper carried by the door jamb having a projection thereon adapted to prevent outward movement of the latch and door.

2. The combination with a hasp to be carried by a door, of a housing mounted thereon having an open bottom providing a finger hold whereby the door may be actuated, a latch pivoted to the hasp beneath the housing and positioned to removably engage a keeper, said latch notched on one of its edges, an actuating lever pivoted to the hasp adjacent the latch, said lever provided with a projecting tooth engaging in the notch in the latch, said hasp equipped with a slot adapted to receive a keeper beneath the housing, and a keeper carried by the door jamb having a projection thereon adapted to prevent outward movement of the latch and door.

3. The combination with a hasp to be carried by a door, of a housing mounted thereon having an open bottom providing a finger hold whereby the door may be actuated, a latch pivoted to the hasp beneath the housing, said hasp equipped with a keeper slot and a rest slot adapted to receive a keeper and a rest member beneath the housing, a keeper plate carried by the door jamb having a keeper thereon adapted to prevent outward movement of the latch and door, and said keeper plate having a rest member thereon adapted to prevent upward and downward movement of the hasp and door.

4. The combination with a hasp adapted to be carried by a door, of a housing mounted thereon having an open bottom providing a finger hold whereby the door may be actuated, a latch pivoted to the hasp beneath the housing, said hasp equipped with a slot adapted to receive a keeper beneath the housing, a keeper carried by the door jamb having a projection thereon adapted to prevent outward movement of the latch and door, and said hasp having a perforation therethrough in position to allow an operator to insert his finger from the rear to operate the pivoted latch.

5. The combination with a hasp to be carried by a door, of a housing mounted thereon having an open bottom providing a finger hold whereby the door may be actuated, a latch pivoted to the hasp beneath the housing, said hasp equipped with a slot adapted to receive a keeper beneath the housing, and a reversible keeper carried by the door jam having means thereon to prevent outward movement of the latch and door, when said keeper is used right or left.

6. The combination with a hasp to be carried by a door, of a latch pivoted to the hasp, a keeper to be carried by the door jam and provided with means to prevent outward movement of the latch and door, and a housing secured to the hasp which envelops the forward face of said hasp and also said latch and keeper, and having an open side to permit access to said latch.

7. The combination with a hasp to be carried by a door, of a housing mounted thereon having an open bottom providing a finger hold, whereby the door may be actuated, a latch pivoted to the hasp beneath the housing, said hasp equipped with a slot adapted to receive a keeper beneath the housing, and a keeper carried by the door jamb having a projection thereon adapted to prevent outward movement of the latch and door, said door and hasp having coinciding slots to allow an operator to insert his finger from the rear to operate said latch.

8. The combination with a hasp to be carried by a door, of a housing mounted thereon having an open bottom providing a finger hold whereby the door may be actuated, a latch pivoted to the hasp beneath the housing, said hasp equipped with a slot adapted to receive a keeper beneath the housing, and a reversible keeper carried by the door jamb having means thereon to prevent outward movement of the latch and door, when said keeper is used right and left, said door and hasp having coinciding slots to allow an operator to insert his finger from the rear to operate said latch.

9. In a device of the character described, in combination, a hasp adapted to be carried by a door, said hasp comprising two hinged members, one of said members having an elongated slot adapting it to be adjusted for aligning the hasp relative to a door to which it may be attached, the other member of said hasp equipped with a slot adapted to receive a keeper, a latch pivoted to said other member of said hasp, a keeper carried by the door jamb having means thereon to prevent outward movement of the latch and door, and a housing mounted on the hasp which envelops the latch and keeper, said housing having an open bottom providing a finger hold, whereby the door may be actuated.

CLINTON L. BELL.